(12) United States Patent
Jensen (10) Patent No.: US 10,107,374 B2
(45) Date of Patent: Oct. 23, 2018

(54) DIFFERENTIAL ASSEMBLY FOR A MACHINE

(71) Applicant: Caterpillar Inc., Peoria, IL (US)

(72) Inventor: Jeffrey Edward Jensen, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 473 days.

(21) Appl. No.: 14/824,162

(22) Filed: Aug. 12, 2015

(65) Prior Publication Data

US 2017/0045128 A1 Feb. 16, 2017

(51) Int. Cl.
*F16H 48/40* (2012.01)
*F16H 48/38* (2012.01)

(52) U.S. Cl.
CPC ....... *F16H 48/40* (2013.01); *F16H 2048/387* (2013.01)

(58) Field of Classification Search
None
See application file for complete search history.

(56) References Cited

U.S. PATENT DOCUMENTS

| | | | |
|---|---|---|---|
| 1,421,834 A | 7/1922 | Ross | |
| 1,657,091 A * | 1/1928 | Morgan | F16H 48/08 475/226 |
| 3,872,741 A | 3/1975 | Berchtold et al. | |
| 4,249,429 A | 2/1981 | Denning | |
| 4,388,842 A * | 6/1983 | Marcell | F16H 48/08 475/237 |
| 5,015,221 A | 5/1991 | Smith | |
| 5,480,360 A * | 1/1996 | Patzer | F16H 48/08 475/230 |
| 5,584,777 A | 12/1996 | Sander et al. | |
| 6,056,663 A | 5/2000 | Fett | |
| 6,422,967 B1 | 7/2002 | Krisher | |
| 6,689,009 B1 | 2/2004 | Fett | |
| 6,849,021 B2 | 2/2005 | Krzesicki et al. | |
| 6,981,929 B2 | 1/2006 | Janiszewski et al. | |
| 8,221,277 B2 | 7/2012 | Vogel et al. | |
| 2007/0238572 A1* | 10/2007 | Todd | F16H 48/08 475/230 |

* cited by examiner

*Primary Examiner* — Colby M Hansen
(74) *Attorney, Agent, or Firm* — William R. Tinker; Jeff A. Greene (57) ABSTRACT

A differential assembly includes a gear member, a cover member, a plurality of differential gears, a plurality of bolts, and a pair of side gears. The gear member is configured to rotate about an axis. The cover member is coupled to the gear member and is configured to rotate together with the gear member. The differential gears are positioned within the cover member. The bolts are threadingly coupled to one of the cover member and the gear member. Each of the bolts is configured to rotatably support a corresponding differential gear thereon. The pair of side gears are meshed with the differential gears.

14 Claims, 4 Drawing Sheets

DIFFERENTIAL ASSEMBLY FOR A MACHINE

TECHNICAL FIELD

The present disclosure relates to a differential assembly for a machine, and more particularly to an adjustable and compact differential assembly for the machine.

BACKGROUND

Typically, a differential assembly may be used in machines for driving wheels of the machine while also permitting a difference in rotational speed between the wheels. The differential assembly may include a gear arrangement that allows torque to be transferred from a driveshaft to a pair of output shafts that are coupled to the wheels. As such, the differential assemblies may operate to allow the output shafts to rotate at different speeds or different torques as needed. A size and configuration of the differential assembly may be critical when the differential assembly needs to fit within tight space constraints offered by the machine.

U.S. Pat. No. 3,872,741 describes a differential gear assembly for coupling an input shaft with a pair of driven axles. The differential gear assembly includes a ring gear engaged with the input shaft, a differential housing secured to the ring gear and supporting a pair of axially spaced apart bevel gears which are coupled to the driven axles, a pinion assembly including two pinion gears meshing with the bevel gears with adjustable means controlling spacing therebetween. The pinion assembly is rigidly coupled for rotation with the differential housing and the ring gear. This arrangement of the pinion gears maintains proper meshing engagement with the bevel gears.

Although the '741 patent discloses an adjustable means for controlling a spacing and/or an amount of meshing between the bevel gears and the pinion gears, the '741 patent does not disclose a compact configuration and size of the differential gear assembly. Hence, there is a need for a differential assembly that overcomes the aforesaid shortcomings.

SUMMARY OF THE DISCLOSURE

In one aspect of the present disclosure, a differential assembly includes a gear member, a cover member, a plurality of differential gears, a plurality of bolts, and a pair of side gears. The gear member is configured to rotate about an axis. The cover member is coupled to the gear member and is configured to rotate together with the gear member. The differential gears are positioned within the cover member. The bolts are threadingly coupled to one of the cover member and the gear member. Each of the bolts is configured to rotatably support a corresponding differential gear thereon. The pair of side gears are meshed with the differential gears.

In another aspect of the present disclosure, a differential assembly includes a gear member, a cover member, a plurality of differential gears, a plurality of bolts, a plurality of first bearing members, a plurality of second bearing members, and a pair of side gears. The gear member is configured to rotate about an axis. The cover member is coupled to the gear member and configured to rotate together with the gear member. The differential gears are positioned within the cover member. The bolts are threadingly coupled to one of the cover member and the gear member. Each of the first bearing members is disposed on a corresponding bolt from the plurality of bolts. The first bearing members are configured to rotatably support the corresponding differential gears thereon. Each of the second bearing members is disposed between the cover member and the corresponding differential gear from the plurality of differential gears. The pair of side gears are meshed with the differential gears.

In yet another aspect of the present disclosure, a powertrain for transmitting driving power from a power source of a machine to a pair of ground engaging members of the machine includes an input shaft, a drive gear, a pair of output shafts, and a differential assembly. The input shaft is configured to receive the driving power from the power source. The drive gear is drivably coupled to the input shaft. The pair of output shafts is coupled to the pair of ground engaging members, wherein each output shaft is coupled to a corresponding ground engaging member. The differential assembly is configured for transmitting the driving power from the drive gear to the pair of output shafts. The differential assembly includes a gear member meshed with the drive gear and configured to rotate about an axis; a cover member coupled to the gear member and configured to rotate together with the gear member; a plurality of differential gears positioned within the cover member; a plurality of bolts threadingly coupled to one of the cover member and the gear member, wherein each of the bolts is configured to rotatably support a corresponding differential gear thereon; and a pair of side gears meshed with the differential gears.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular is also to be construed to relate to the plural and vice-versa without limiting the scope of the disclosure to the exact number or type of such elements unless set forth explicitly in the appended claims.

Figure 1:
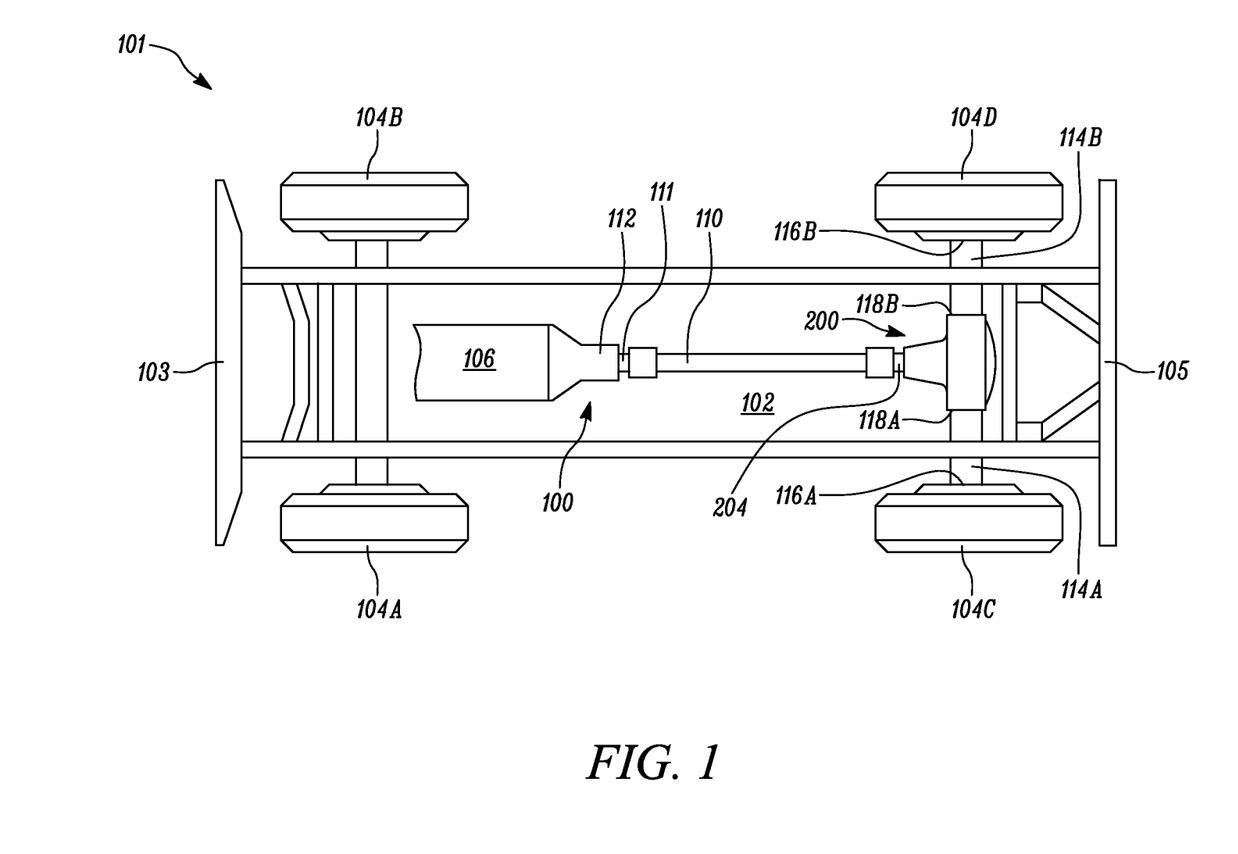
FIG. 1 is a schematic view showing a powertrain of a machine, according to an embodiment of the present disclosure.

Referring to FIG. 1, a schematic view of a powertrain 100 of an exemplary machine 101 is illustrated. The machine 101 may be embodied in the form of a backhoe loader, an excavator, a dozer, a wheel loader, a motor grader, an off-highway vehicle, an on-highway vehicle or other machines typically employed in applications, such as mining, forestry, waste management, construction, agriculture, transportation and the like. The present disclosure is generally relevant to any machine having the powertrain 100, as will become evident from the following description.

The machine 101 includes a frame 102 and a set of ground engaging members 104 rotatably supported thereon. The frame 102 may also support the powertrain 100 thereon. The set of ground engaging members 104 may be configured to provide mobility to the machine 101. In the embodiment of FIG. 1, the set of ground engaging members 104 are wheels. Further, the set of ground engaging members 104 may include a pair of front ground engaging members 104A, 104B disposed proximate to a front side 103 of the machine 101. The set of ground engaging members 104 may also include a pair of rear ground engaging members 104C, 104D disposed proximate to a rear side 105 of the machine 101. Alternatively, the set of ground engaging members 104 may include tracks. Although, the pair of front ground engaging members 104A, 104B and the pair of rear ground engaging members 104C, 104D are illustrated, it may be recognized that the machine 101 may include any number of ground engaging members 104.

The machine 101 includes a power source 106 that may be configured to supply driving power to various components including, but not limited to, the front and/or the rear set of ground engaging members 104A, 104B and 104C, 104D. The power source 106 may include an internal combustion engine. For example, the power source 106 may be embodied in the form of a diesel engine, a gasoline engine, a gaseous fuel-powered engine, or any other engine known in the art. It is also contemplated that the power source 106 may alternatively include a non-combustion source such as, for example, an electric motor, or be embodied in any other known non-combustion source of power.

The powertrain 100 is configured to transmit the driving power from the power source 106 to at least one of the pair of front ground engaging members 104A, 104B and the pair of rear ground engaging members 104C, 104D. In the illustrated embodiment of FIG. 1, the powertrain 100 is configured to transmit the driving power to the pair of rear ground engaging members 104C, 104D.

The powertrain 100 includes an input shaft 110 defining an axis AA'. The input shaft 110 may be configured to receive the driving power from the power source 106 via a transmission system 112. The transmission system 112 may be operatively coupled between the power source 106 and a first end 111 of the input shaft 110. The transmission system 112 may include various components such as, for example, gears, pinions, and the like to transmit the driving power from the power source 106 to the input shaft 110 at various speed-to-torque ratios. The input shaft 110 may rotate about the axis AA' upon receiving the driving power through the transmission system 112. In various examples, the transmission system 112 may include a power-shift transmission, a continuously variable transmission, a hybrid transmission, or any other types of transmission systems known in the art.

The powertrain 100 further includes output shafts that are associated with the set of ground engaging members 104. As shown in FIG. 1, a pair of output shafts 114A, 114B may be coupled to the rear ground engaging members 104C, 104D respectively. Each of the output shafts 114A, 114B may include first ends 116A, 116B and second ends 118A, 118B respectively. The first ends 116A, 116B of the output shafts 114A, 114B may be coupled to the rear ground engaging members 104C, 104D respectively for rotation therewith.

The powertrain 100 also includes a differential assembly 200 disposed adjacent to a second end 204 of the input shaft 110. In general, the differential assembly 200 may be configured to receive driving power from the input shaft 110 and provide a rotational output to a pair of output shafts to drive the corresponding ground engaging members 104. In the illustrated embodiment of FIG. 1, the differential assembly 200 is configured to provide a rotational output to the pair of output shafts 114A, 114B associated with the pair of rear ground engaging members 104C, 104D. The differential assembly 200 may allow the ground engaging members 104C, 104D to rotate at different speeds and/or different torques relative to one another when required. As shown, the differential assembly 200 may be disposed between the second ends 118A, 118B of the output shafts 114A, 114B respectively.

The differential assembly 200 will be explained hereinafter in conjunction with the powertrain 100 of FIG. 1. However, one of ordinary skill in the art will appreciate that the differential assembly 200 disclosed herein may be configured for implementation in powertrains of various other configurations known in the art. For example, the differential assembly 200 may be configured to transmit the driving power to the pair of front ground engaging members 104A, 104B, the pair of rear ground engaging members 104C, 104D, a combination thereof, or as desired.

Figure 2:
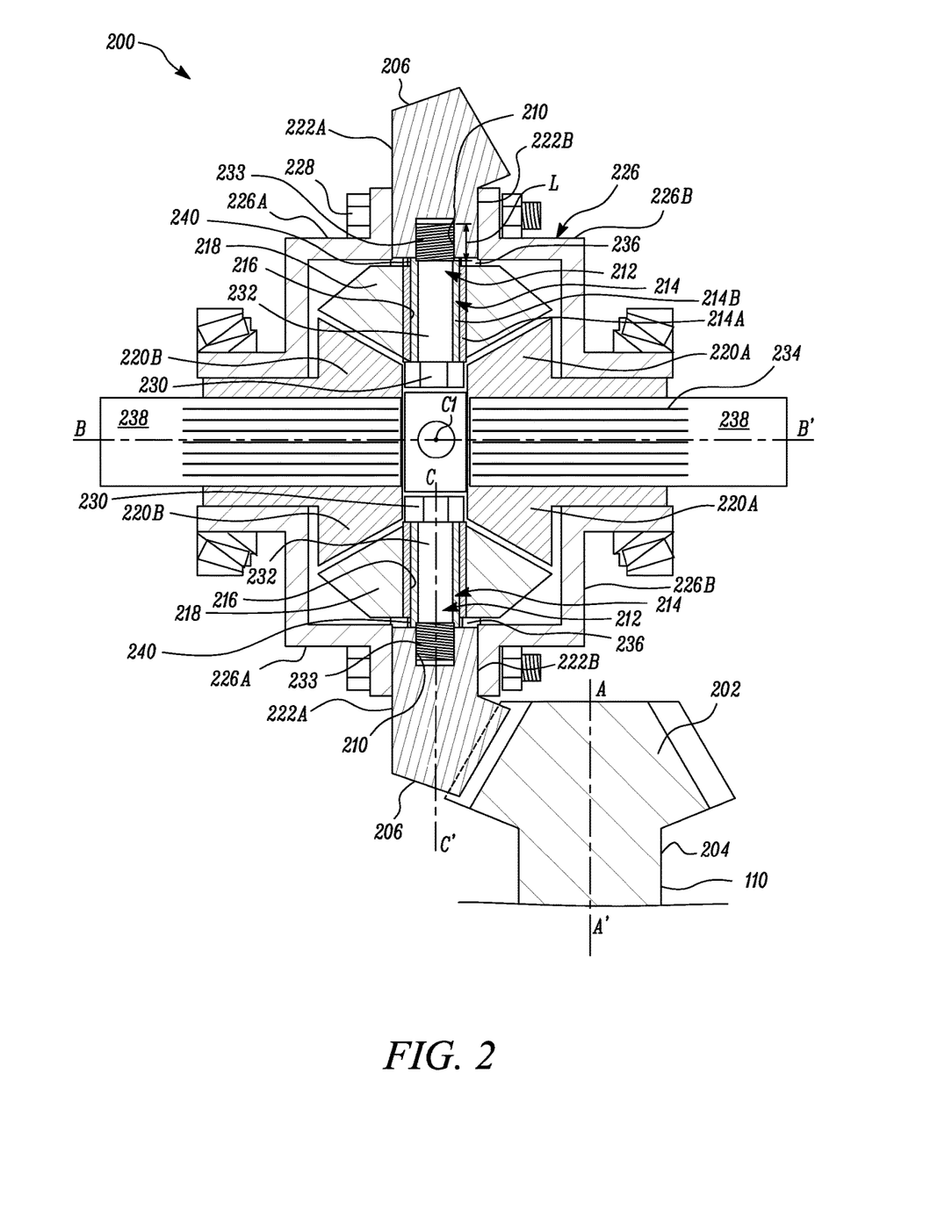
FIG. 2 is a side sectional view of a differential assembly of the powertrain, in accordance with an embodiment of the present disclosure.
Figure 3:
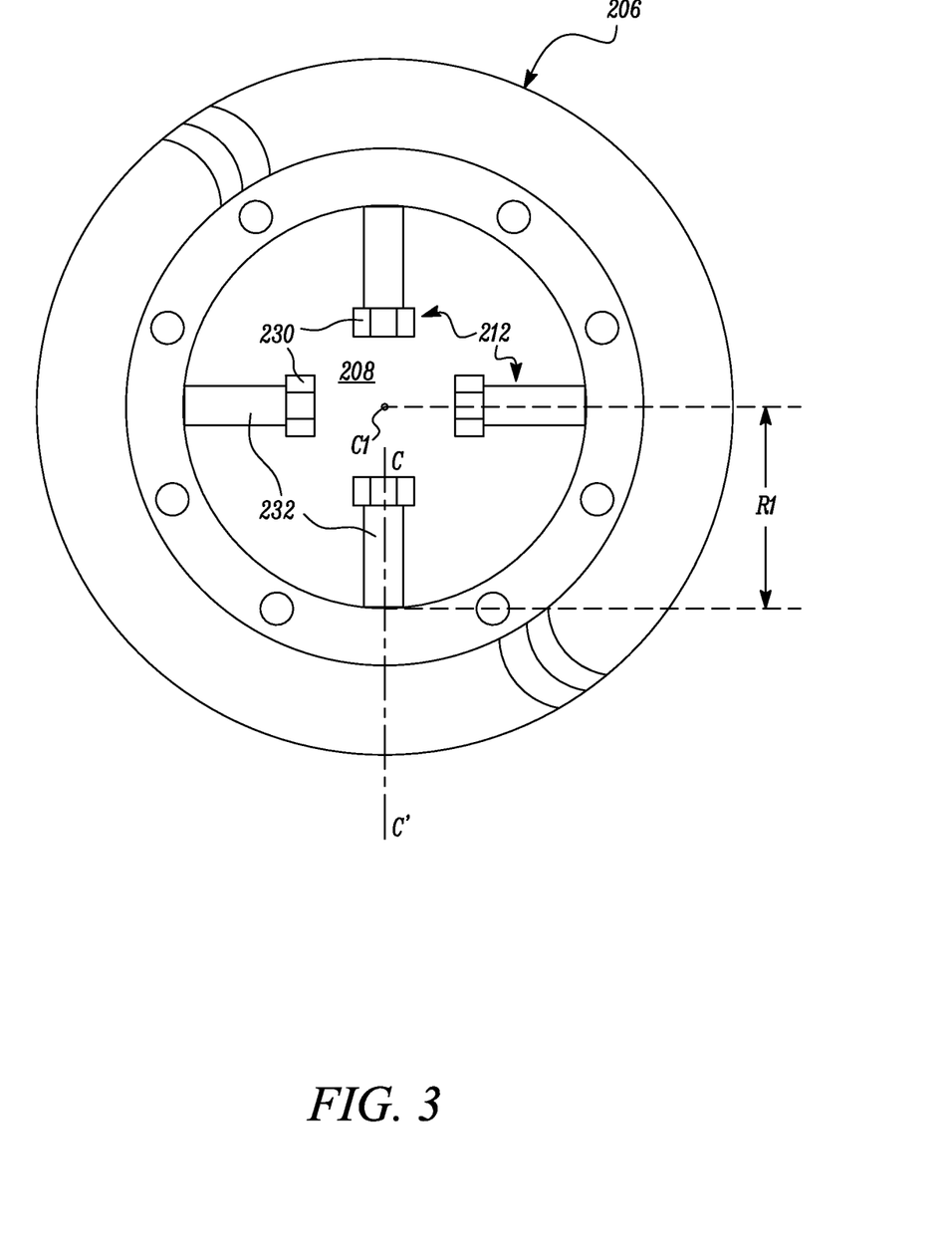
FIG. 3 is a front orthogonal view of a driven gear employed by the differential assembly from FIG. 2.

Referring to FIGS. 2 and 3, the differential assembly 200 includes a drive gear 202 for receiving a rotational input from the input shaft 110. The drive gear 202 may be fixedly coupled to the input shaft 110 at the second end 204 thereof. Further, the input shaft 110, as disclosed earlier herein, may receive the driving power from the power source 106 through the transmission system 112. In the illustrated embodiment of FIG. 2, the drive gear 202 is a bevel gear.

The differential assembly 200 also includes a gear member 206 (hereinafter sometimes referred to as 'the driven gear' and designated with identical numeral '206'). The driven gear 206 is configured to engage with the drive gear 202 so as to rotate in unison with the drive gear 202 during operation of the differential assembly 200. In the illustrated embodiment, the driven gear 206 is embodied in the form of a ring gear. The driven gear 206 has an axis of rotation BB' about its center C1. The driven gear 206 may be disposed in mesh with the drive gear 202 such that the axis AA' of the input shaft 110 and the axis of rotation BB' of the driven gear 206 are disposed perpendicularly to each other. Further, the drive gear 202 may transmit the rotatory power to the driven gear 206 causing the driven gear 206 to rotate about the axis of rotation BB'.

The driven gear 206 defines a central bore 208 (shown in FIG. 3) about the axis of rotation BB'. The central bore 208 may have a radius R1. In an embodiment as shown in FIG. 2, the driven gear 206 further defines multiple threaded holes 210 therein. For example, two threaded holes 210 are shown diametrically opposing each other in the cross-sectional view of FIG. 2. However, fewer or more number of holes could be present depending on a number of differential gears used in a given differential assembly. Moreover, it should be noted that the exact number of differential gears used in a differential assembly could vary from one application to another. Hence, a number of holes present in the driven gear is merely exemplary in nature and non-limiting of this disclosure.

The differential assembly 200 includes bolts 212 that are threadingly coupled to the driven gear 206. The bolts 212 are threadingly received by the holes 210 defined in the driven gear 206. In the illustrated embodiment of FIG. 3, four bolts 212 have been shown located radially at a 90 degree angle to one another. Referring to FIG. 2, each of these bolts 212 is configured to rotatably support a corresponding differential gear 218 thereon. In this embodiment, the differential gears 218 may be disposed at least in part within the central bore 208 of the driven gear 206.

Additionally or optionally, the differential assembly 200 can further include first bearing members 214. Each of the first bearing members 214 are disposed between a bolt 212 and a corresponding differential gear 218. Each of the first bearing members 214 are configured to provide a smooth outer surface 216 to the corresponding differential gear 218 for rotation thereon.

In the illustrated embodiment of FIG. 2, each of the first bearing members 214 include a first spacer element 214A and a second spacer element 214B. Moreover, in this embodiment, each of the first bearing members 214 (i.e., the first spacer element 214A and the second spacer element 214B) is embodied in the form of a sleeve bearing. However, in alternative embodiments, the first bearing members 214 could be embodied in the form of roller bearings, journal bearings, collar bearings, and the like.

The first spacer element 214A may be made from hard materials such as, but not limited to, steel while the second spacer element 214B could be made out of a relatively softer material for e.g., bronze that is suitable for allowing sliding movement of the differential gear 218 thereon. The relative difference in the hardness of the materials used for the first spacer element 214A and the second spacer element 214B can beneficially help in improving an overall pressure-velocity value of the first bearing member 214. This increase in the overall pressure-velocity value of the first bearing member 214 could help improve a service life of the first bearing member 214. However, it may be noted that this exemplary configuration of the first bearing member 214 disclosed herein could entail coupling the second spacer element 214B to the first spacer element 214A such that the first spacer element 214A remains stationary with the bolt 212 while the second spacer element 214B would be free to rotate about the first spacer element 214A and would therefore, provide two sliding surfaces between the corresponding differential gear 218 and the first spacer element 214A.

With continued reference to FIGS. 2 and 3, each of the bolts 212 includes a head portion 230, a shank portion 232, and a threaded portion 233. The head portion 230 of a given bolt 212 in the differential assembly 200 is configured to retain the corresponding first bearing member 214. The shank portion 232 extends from the head portion 230 and receives the corresponding first bearing member 214 thereon. The threaded portion 233 extends from the shank portion 232, and is configured to be threadingly coupled to the driven gear 206 vis-à-vis the threaded holes 210 defined on the driven gear 206.

The differential assembly 200 may also include side gears 220A, 220B as shown in FIG. 2. Each of the side gears 220A, 220B is configured to receive a rotational input from the driven gear 206. The side gear 220A may be disposed on the first side 222A of the driven gear 206 and the side gear 220B may be disposed on the second side 222B of the driven gear 206. Moreover, the side gears 220A and 220B may be configured to be in mesh with each of the differential gears 218.

Further, the side gears 220A, 220B are also coupled to the output shafts 114A, 114B adjacent to the second ends 118A, 118B respectively. As such, the side gears 220A, 220B may rotate together with the corresponding output shafts 114A, 114B. In an example, the side gears 220A, 220B may include splines (not shown) disposed on an inner surface thereof. The splines of the side gears 220A, 220B may be coupled to corresponding splines 234 formed on an outer surface 238 of the output shafts 114A, 114B adjacent to the second ends 118A, 118B.

With regards to the bolts 212 of the differential assembly 200, it should be noted that a length L of the threaded portion 233 coupled to the driven gear 206 is changeable so as to allow adjustment in a contact profile between the corresponding differential gear 218 and the pair of adjacently located side gears 220A, 220B. The length L to which the threaded portion 233 of a given bolt 212 engages with the driven gear 206 can be changed by rotating the head portion 230 of the bolt 212 clockwise or counter-clockwise about its own axis CC'. With a change in the engaged length L of the threaded portion 233, the corresponding differential gear 218 can be moved into or out of the center C1 of the differential assembly 200. This movement can be beneficially used to adjust the contact profile of the corresponding differential gear 218 with the pair of co-located side gears 220A, 220B.

With continued reference to FIG. 2, the differential assembly 200 further includes second bearing members 236 that are disposed between a cover member 226 (also commonly known as 'differential casing' or 'differential housing'), the driven gear 206, and each of the differential gears 218. Each of the second bearing members 236 defines an opening 240 therethrough. As shown in FIG. 2, the opening 240 is configured i.e., sized and/or shaped to at least partly receive the corresponding first bearing member 214 therein.

The second bearing members 236 are configured to axially support the respective differential gears 218 within the cover member 226. In one embodiment, the second bearing members 236 are made from a High PV (pressure-velocity) polymer. However, the second bearing members 236 could alternatively be made using various other suitable materials known to one skilled in the art. A type and/or nature of material used in forming the second bearing members 236 are non-limiting of this disclosure. Persons having ordinary skill in the art can contemplate forming the second bearing members 236 using any type of material depending on specific requirements of an application.

As shown in FIG. 2, the cover member 226 is rigidly coupled to the driven gear 206. The cover member 226 is configured to rotate together with the driven gear 206. In the illustrated embodiment of FIG. 2, the differential assembly 200 includes two cover members namely, a first cover member 226A and a second cover member 226B. However, in other embodiments, the differential assembly 200 may include a single-piece cover member or a cover member that is formed from more than two pieces. The specific number of pieces that form the cover member 226 of the present disclosure is merely exemplary in nature and hence, non-limiting of this disclosure. Persons ordinarily skilled in the art will appreciate that the cover member 226 disclosed herein may be made from any number of pieces without deviating from the spirit of the present disclosure.

The first cover member 226A may be disposed adjacent to the first side 222A of the driven gear 206. Further, the first cover member 226A may be configured to at least partially enclose the first side 222A of the driven gear 206. The second cover member 226B may be disposed adjacent to the second side 222B of the driven gear 206. Further, the second cover member 226B may be configured to at least partially enclose the second side 222B of the driven gear 206.

With continued reference to FIG. 2, the first and second cover members 226A, 226B are rigidly coupled to the driven gear 206 so that the first and second cover members 226A, 226B can rotate together with the driven gear 206. In the illustrated embodiment, each of the first and second cover members 226A, 226B may be coupled to the driven gear 206 with the help of fasteners 228. In an example as shown in FIG. 2, the fasteners 228 are embodied in the form of bolts. However, it may be contemplated to use other structures and methods known in the art for coupling each of the first and second cover members 226A, 226B to the driven gear 206.

In an embodiment, the differential assembly 200 may operate so that a substantially equal amount of torque is transmitted to each of the pair of output shafts 114A, 114B. As such, the output shafts 114A, 114B can rotate at different speeds relative to each other. Additionally or optionally, the differential assembly 200 may include a locking arrangement such as, but not limited to, a clutch assembly (not shown) and other actuators known to one skilled in the art that allows each of the output shafts 114A, 114B to rotate at a substantially equal speed.

In an embodiment, the clutch assembly may be of a type that can be coupled with at least one cover member 226A, 226B and one side gear 220A, 220B. It is hereby envisioned that the clutch assembly could move between a locked position and an unlocked position. In the locked position, the clutch assembly could rotationally lock the side gears 220A or 220B with the corresponding cover member 226A or 226B. As such, the side gears 220A, 220B on both the first and the second sides 222A, 222B of the driven gear 206 may rotate at a substantially same speed. In the unlocked position, the clutch assembly may allow a speed differential between each of the output shafts 114A, 114B.

A person of ordinary skill in the art will acknowledge that the clutch assembly described herein is exemplary in nature and hence, non-limiting of this disclosure. Numerous types of clutch assemblies are known in the art and such clutch assemblies may be implemented in the differential assembly 200 so as to be consistent with functions disclosed herein. However, as shown in FIG. 2, it can also be optionally contemplated to configure the differential assembly 200 without the use of a clutch assembly.

Figure 4:
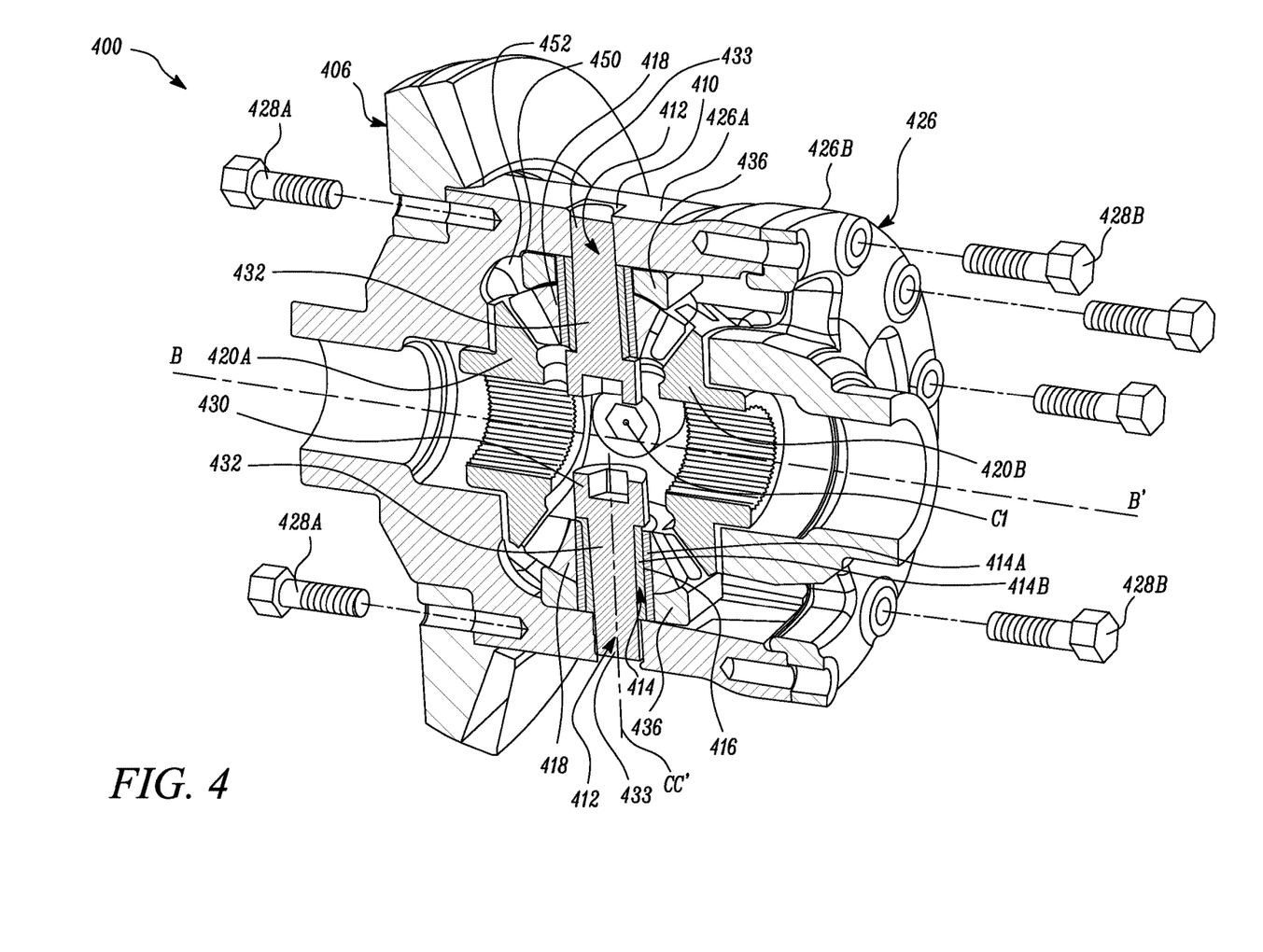
FIG. 4 is a breakaway view of the differential assembly, in accordance with another embodiment of the present disclosure.

Referring to FIG. 4, a differential assembly 400 in accordance with another embodiment of this disclosure is illustrated. Since the differential assembly 400 is generally reminiscent of the differential assembly 200 from FIG. 2, components which are similar between the differential assembly 400 and the differential assembly 200 will be annotated by similar numbers increased by 200. Moreover, it should be noted that for purposes of brevity in this document, re-capitulation in the explanation pertaining to components similar between differential assembly 200 and differential assembly 400 has been avoided herein.

In the illustrated embodiment of FIG. 4, the differential assembly 400 includes fasteners 428A that are configured to couple the gear member 406 (hereinafter 'driven member 406') to the cover member 426. The cover member 426 illustrated in the embodiment of FIG. 4 is a two-piece cover having a first cover member 426A and a second cover member 426B mutually fastened to one another using fasteners 428B. As shown, the fasteners 428A help to couple the driven member 406 to the first cover member 426A so as to be coupled in a rigid manner.

Moreover, the cover member 426 defines threaded holes 410 therein. Each of these threaded holes 410 is configured to threadingly receive a bolt 412 therein. As with the differential assembly 200, each bolt 412 in the differential assembly 400 is also configured to rotatably support a differential gear 418 thereon. In the illustrated embodiment of FIG. 4, the first cover member 426A is shown to define threaded holes 410 therein. The threaded portion 433 of each bolt 412 is shown as being threadingly received within the corresponding threaded hole 410 of the first cover member 426A.

Further, in the illustrated embodiment of FIG. 4, the first cover member 426A defines recesses 450 therein. The recesses 450 are located on an inner surface 452 of the first cover member 426A. Each of these recesses 450 is configured to at least partly receive a corresponding second bearing member 436. The recesses 450 can help accomplish a firm seating of the second bearing members 436 thus preventing a dislodgement of the second bearing members 436 during operation of the differential assembly 400.

Various additional components and features associated with the differential assembly 200/400 such as clutch assemblies, seals, rings, bushings, spacers and the like have been omitted in the illustrations for the sake of simplicity and aiding clarity in understanding of the present disclosure. Therefore, such omission of the additional components and/or features must not be construed as being limiting of this present disclosure, rather the differential assembly 200/400 may be implemented with such additional components and/or features depending on specific requirements of an application.

Various embodiments disclosed herein are to be taken in the illustrative and explanatory sense, and should in no way be construed as limiting of the present disclosure. All joinder references (e.g., attached, affixed, coupled, engaged, connected, and the like) are only used to aid the reader's understanding of the present disclosure, and may not create limitations, particularly as to the position, orientation, or use of the modules/devices and/or methods disclosed herein. Such joinder references are to be construed broadly. Moreover, such joinder references can infer that two elements or modules are not directly connected to each other.

Additionally, all numerical terms, such as, but not limited to, "first", "second", "third", or any other ordinary and/or numerical terms, should also be taken only as identifiers, to assist the reader's understanding of the various modules, circuits, elements, embodiments, variations and/ or modifications of the present disclosure, and may not create any limitations, particularly as to the order, or preference, of any conduit, circuit, element, embodiment, variation and/or modification relative to, or over, another conduit, circuit, element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to a differential assembly for a machine. More specifically, the present disclosure relates to an axially compact differential assembly.

Embodiments of the present disclosure have applicability for implementation and use in reducing an overall weight and size of a differential assembly. Accordingly, embodiments of the present disclosure can help reduce an overall weight and size of a differential casing that is used to enclose components of a differential assembly therein.

Previously known differential assemblies were conventionally produced using complex, bulky, and/or expensive components that were typically used for nesting differential gears within the body of the differential assembly. However, with use of the bolts 212/412 (shown in FIGS. 2 and 4 respectively) disclosed herein, manufacturers may do away with use of the previously known complex, bulky, and/or expensive components for nesting differential gears inside a given differential assembly.

Moreover, the differential assemblies 200/400 of the present disclosure also allow adjustments in the contact profile between the differential gears and the side gears to be possible. By rotating the bolts 212 clockwise or counter-clockwise about their respective axis CC', the corresponding differential gears can be radially moved into or away from the center C1. Therefore, using the bolts 212/412 of the present disclosure, service personnel can easily and quickly move the differential gears 218/418 and hence, make adjustments to the engagement of the differential gears 218/418 with the co-located side gears 220A, 220B or 420A, 420B respectively.

Furthermore, as the components used in the differential assemblies 200/400 are simple and light-weight, such components may help manufacturers offset time and costs previously incurred with the use of complex, bulky, and/or expensive components when nesting differential gears inside a given differential assembly. Therefore, an overall size, weight, and production cost for the differential assemblies 200/400 of the present disclosure is minimized Additionally, such an axially compact differential assembly 200/400 may provide space for fitment of other components of the powertrain 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A differential assembly comprising:
    a gear member having a plurality of threaded holes positioned therein configured to rotate about an axis;
    a cover member coupled to the gear member and configured to rotate together with the gear member;
    a plurality of differential gears positioned within the cover member;
    a plurality of bolts threadingly coupled to the gear member, each of the plurality of bolts configured to rotatably support a corresponding differential gear of the plurality of differential gears thereon; and
    a pair of side gears meshed with the differential gears.

2. The differential assembly of claim 1, further comprising a plurality of first bearing members, each of the plurality of first bearing members disposed between a corresponding bolt of the plurality of bolts and the corresponding differential gear of the plurality of differential gears.

3. The differential assembly of claim 2, wherein each of the plurality of bolts comprises:
    a head portion configured to retain a corresponding first bearing member of the plurality of first bearing members;
    a shank portion extending from the head portion and receiving the corresponding first bearing member thereon; and
    a threaded portion extending from the shank portion threadingly coupled to the gear member.

4. The differential assembly of claim 3, wherein a length to which the threaded portion is coupled to the gear member is changeable so as to adjust a contact profile between the plurality of differential gears and the pair of side gears.

5. The differential assembly of claim 2, wherein each of the plurality of first bearing members is a sleeve bearing.

6. The differential assembly of claim 2, further comprising a plurality of second bearing members, each of the plurality of second bearing members disposed between the cover member, the gear member, and the corresponding differential gear of the plurality of differential gears.

7. The differential assembly of claim 6, wherein each of the plurality of second bearing members is made of a high pressure velocity polymer.

8. The differential assembly of claim 6, wherein each of the plurality second bearing members define an opening therethrough, the opening configured to at least partly receive the corresponding first bearing member of the plurality of first bearing members therein.

9. The differential assembly of claim 1, wherein the cover member comprises a first cover member coupled to a first surface of the gear member and a second cover member coupled to a second surface of the gear member, and wherein the first surface is disposed in a mutually opposing relation with the second surface.

10. The differential assembly of claim 1, further comprising a plurality of fasteners configured to couple the gear member to the cover member.

11. A differential assembly comprising:
    a gear member having a plurality of threaded holes therein configured to rotate about an axis;
    a cover member coupled to the gear member and configured to rotate together with the gear member;
    a plurality of differential gears positioned within the cover member;
    a plurality of bolts threadingly coupled to the gear member;
    a plurality of first bearing members, each of the plurality of first bearing members disposed on a corresponding bolt of the plurality of bolts, wherein each of the plurality of first bearing members is configured to rotatably support a corresponding differential gear of the plurality of differential gears thereon;
    a plurality of second bearing members, each of the plurality of second bearing members disposed between the gear member, and the corresponding differential gear of the plurality of differential gears; and
    a pair of side gears meshed with the differential gears.

12. The differential assembly of claim 11, wherein each of the plurality of bolts comprises:
    a head portion configured to retain a corresponding first bearing member of the plurality of first bearing members;
    a shank portion extending from the head portion and receiving the corresponding first bearing member thereon; and
    a threaded portion extending from the shank portion and configured to be threadingly coupled to the gear member.

13. A powertrain for transmitting driving power from a power source of a machine to a pair of ground engaging members of the machine, the powertrain comprising:
    an input shaft configured to receive the driving power from the power source;
    a drive gear drivably coupled to the input shaft;

a pair of output shafts coupled to the pair of ground engaging members; and a differential assembly for transmitting the driving power from the drive gear to the pair of output shafts, the differential assembly comprising:

a gear member meshed with the drive gear and configured to rotate about an axis;

a cover member coupled to the gear member and configured to rotate together with the gear member;

a plurality of differential gears positioned within the cover member;

a plurality of bolts threadingly coupled to the gear member, each of the plurality of bolts configured to rotatably support a corresponding differential gear of the plurality of differential gears thereon; and a pair of side gears meshed with the differential gears.

14. The powertrain of claim 13, wherein the gear member defines a plurality of threaded holes therein, each of the threaded holes configured to threadingly receive a corresponding bolt of the plurality of bolts.

* * * * *